United States Patent
Auld et al.

(10) Patent No.: US 9,086,608 B2
(45) Date of Patent: Jul. 21, 2015

(54) LASER PROBE WITH AN ELECTRICALLY STEERABLE LIGHT BEAM

(75) Inventors: Jack R. Auld, Laguna Niguel, CA (US); Ronald T. Smith, Irvine, CA (US)

(73) Assignee: ALCON RESEARCH, LTD., Fort Worth, TX (US)

( * ) Notice: Subject to any disclaimer, the term of this patent is extended or adjusted under 35 U.S.C. 154(b) by 604 days.

(21) Appl. No.: 13/226,675

(22) Filed: Sep. 7, 2011

(65) Prior Publication Data

US 2013/0057821 A1    Mar. 7, 2013

(51) Int. Cl.
G02F 1/13       (2006.01)
G02F 1/29       (2006.01)
G02F 1/1334    (2006.01)

(52) U.S. Cl.
CPC ............... *G02F 1/29* (2013.01); *G02F 1/1334* (2013.01)

(58) Field of Classification Search
USPC ........................... 349/196, 202; 359/320, 316
See application file for complete search history.

(56) References Cited

U.S. PATENT DOCUMENTS

| | | | |
|---|---|---|---|
| 6,031,658 A | 2/2000 | Riza | |
| 6,832,028 B2 * | 12/2004 | Gu et al. | 385/41 |
| 7,198,737 B2 * | 4/2007 | Natarajan et al. | 252/582 |
| 7,400,787 B2 | 7/2008 | Burns | |
| 7,473,249 B2 | 1/2009 | Scheller et al. | |
| 7,557,979 B2 * | 7/2009 | Cicchiello et al. | 359/254 |
| 7,566,173 B2 | 7/2009 | Auld et al. | |
| 8,463,080 B1 * | 6/2013 | Anderson et al. | 385/3 |
| 2005/0122566 A1 | 6/2005 | Cicchiello | |
| 2007/0024978 A1 | 2/2007 | Jackson et al. | |
| 2007/0265602 A1 | 11/2007 | Mordaunt et al. | |
| 2008/0063808 A1 | 3/2008 | Stumpe et al. | |
| 2010/0228124 A1 | 9/2010 | Brennan et al. | |
| 2011/0052114 A1 | 3/2011 | Bernasconi et al. | |
| 2011/0144627 A1 | 6/2011 | Smith | |

OTHER PUBLICATIONS

Bibliographic Data Only: "Electrically switchable multi-spot laser probe"; currently pending unpublished patent application; U.S. Appl. No. 13/308,875, filed Dec. 1, 2011.
Bibliographic Data Only: "Functionally Graded Material Tube and Method for Use of the Same in Implantation"; currently pending unpublished patent application; U.S. Appl. No. 13/488,816, filed Jun. 5, 2012.
PCT/US2012/043504, International Search Report, International Searching Authority, Sep. 14, 2012, 2 pgs.

* cited by examiner

*Primary Examiner* — Huyen Ngo
(74) *Attorney, Agent, or Firm* — Jason Finch

(57) ABSTRACT

A laser probe for electrically steering a light beam includes a tubular-shaped housing, an optical waveguide, and a beam steering cell. The optical waveguide is disposed within an interior region of the housing and is configured to emit a light beam travelling in a first direction. The beam steering cell is disposed within the housing and comprises an electro-optical (EO) material. The beam steering cell is configured to receive one or more voltages and electrically steer the light beam with the OE material to a second direction. The EO element has a shape of varying thickness such that a first portion of the light beam passes through a portion of EO element having a greater thickness than a second portion of the EO element passed through by a second portion of the light beam. The laser probe may be a directional laser probe or a multi-spot laser probe.

7 Claims, 6 Drawing Sheets

LASER PROBE WITH AN ELECTRICALLY STEERABLE LIGHT BEAM

TECHNICAL FIELD

The present disclosure relates generally to laser probes, and more particularly to a laser probe with an electrically steerable light beam.

BACKGROUND

Laser probes have one or more optical fibers that emit light beams. Laser probes typically use mechanical approaches to steer the emitted light beams. For example, an optical fiber may be placed in a tube that can be bent or straightened to emit a light beam in a particular direction. As another example, prisms rotated by motors may steer light beams passing through the prisms. As yet another example, a laser probe may have different optical fibers that direct a light beam in different directions, and a light beam is focused onto a particular fiber to direct the beam in a particular direction. Known laser probes, however, may not be able to steer emitted light beams in a satisfactory manner in certain situations.

BRIEF SUMMARY

Certain embodiments are directed towards a laser probe that electrically steers emitted light beam. The laser probe may include a housing, an optical waveguide, and a beam steering cell. The housing has a tubular shape defining an interior region. The optical waveguide is disposed within the interior region and is configured to emit a light beam travelling in a first direction. The beam steering cell is disposed within the housing and comprises an electro-optical (EO) material. The beam steering cell is configured to receive one or more voltages and electrically steer the light beam with the OE material to a second direction. The laser probe may be a directional laser probe or a multi-spot laser probe.

BRIEF DESCRIPTION OF THE DRAWINGS

Exemplary embodiments of the present disclosure are described by way of example in greater detail with reference to the attached figures, in which.

DETAILED DESCRIPTION OF THE INVENTION

Figure 1:
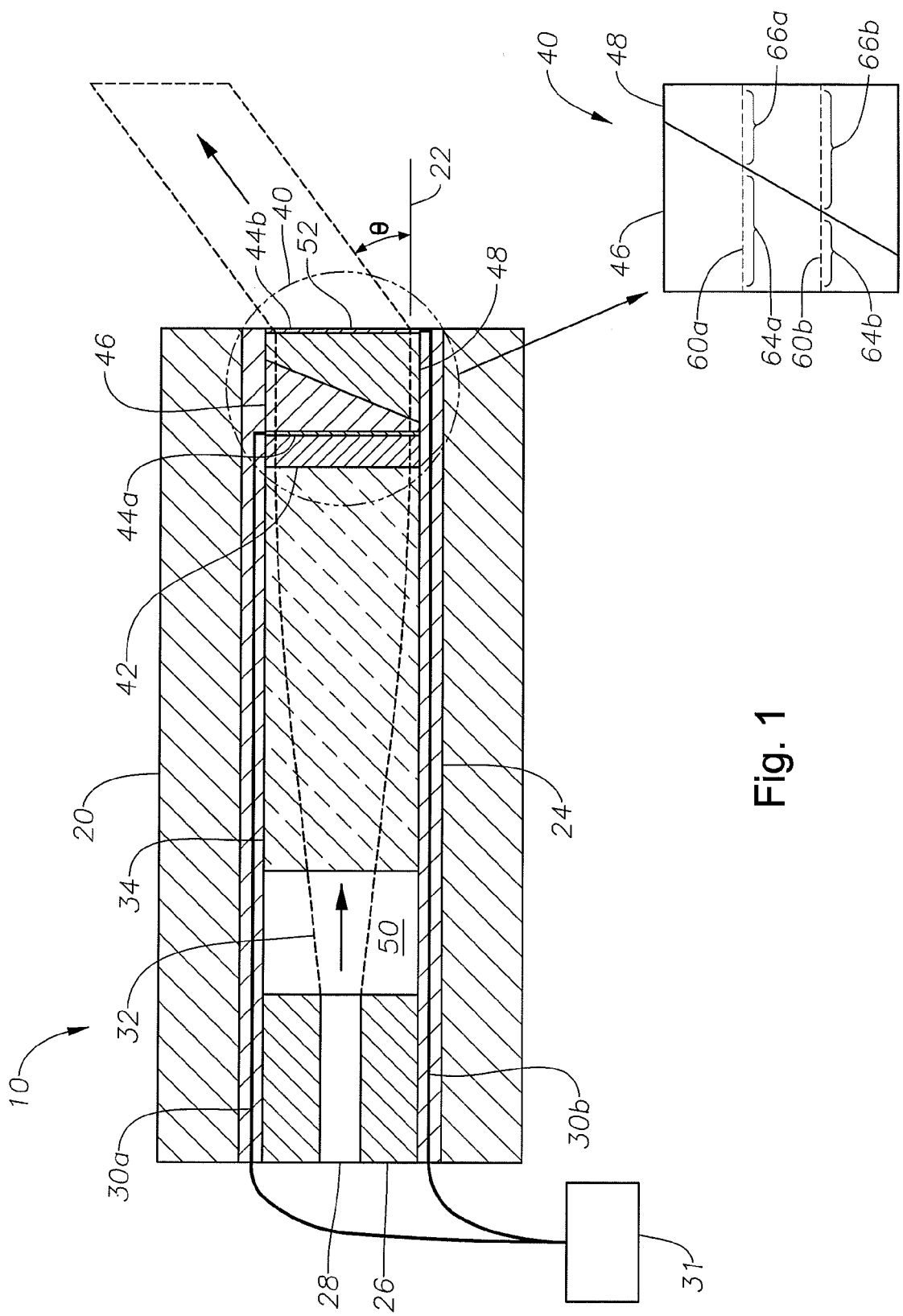
FIG. 1 illustrates an example of a system that can electrically steer light in a laser probe according to certain embodiments.

Referring now to the description and drawings, example embodiments of the disclosed apparatuses, systems, and methods are shown in detail. The description and drawings are not intended to be exhaustive or otherwise limit or restrict the claims to the specific embodiments shown in the drawings and disclosed in the description. Although the drawings represent possible embodiments, the drawings are not necessarily to scale and certain features may be exaggerated, removed, or partially sectioned to better illustrate the embodiments.

FIG. 1 illustrates an example of a system 10 that can electrically steer light in a laser probe according to certain embodiments. In certain embodiments, system 10 may inserted into a human (or other living or previously living) body for medical purposes, such as for ophthalmic surgery. For example, system 10 may be an endoilluminator surgical instrument for projecting light into an interior of an eyeball.

In the illustrated example, system 10 includes a cannula 20 (or other housing), an inner cylinder 24 disposed within cannula 20, a sleeve 26 disposed within inner cylinder 24, and an optical fiber 28 (or other optical waveguide) disposed within sleeve 26. Electrodes 30 (30a-b) are disposed within the walls of inner cylinder 24. Optical fiber 28 emits a beam 32. Lens 34 and a beam steering cell 40 are disposed within inner cylinder 24 in the direction of beam 32. Beam steering cell 40 comprises, in the direction of beam 32, a cover plate 42, an electrode layer 44a, an electro-optical (EO) element 46, a prism 48, and an electrode layer 44b. In an example of operation, optical fiber 28 emits a light beam travelling in a first direction. Beam steering cell 40 receives one or more voltages and the light beam, and electrically steers the light beam to a second direction.

The housing (e.g., cannula 20) may have any suitable shape and size. The housing may have a tubular (or cylindrical) shape with a cylindrical axis 22 and any suitable length and diameter, such as a length in the range of one to two inches, an outer diameter (OD) in the range of 0.05 to 0.02 inches, and an inner diameter (ID) in the range of 0.04 to 0.01 inches (but of course can be larger or smaller). For cannulas, the size may depend on the gauge (ga) of the cannula. For example, 20 ga cannulas may be approximately 0.0365" in OD and 0.031" in ID; 23 ga cannulas may be approximately 0.0255" in OD and 0.021" in ID; and 25 ga cannulas may be approximately 0.0205" in OD and 0.0156" in ID. This disclosure contemplates even smaller (higher gauge) cannulas.

In certain embodiments, the housing may have an interior surface that defines an interior region 50. The surface of the housing may define at least one opening, such a distal end opening 52, and may also define another opening, such a proximal end opening. The housing may comprise any suitable material, e.g., a metal such as stainless steel. In certain embodiments, the housing may be a cannula 20 that can be inserted into the body for medical purposes, such as for ophthalmic surgery.

Inner cylinder 24 disposed within cannula 20 may further define interior region 50. In certain embodiments, inner cylinder 24 electrically insulates interior region 50 from the region exterior to inner cylinder 24. Inner cylinder 24 may comprise any suitable material, e.g., ceramic. Sleeve 26 disposed within inner cylinder 24 supports and holds the optical waveguide (such as optical fiber 28) in position to direct beam 32 to lens 34.

Optical fiber 28 is a transparent fiber that operates as a waveguide to transmit light from a laser source to emit a light beam 32. Light beam 32 may be travelling in a first direction, which may substantially coincide with cylindrical axis 22 of cannula 20. Lens 34 receives and collimates light beam 32. Lens 34 may be any lens suitable for collimating a light beam, such as a gradient-index (GRIN) lens.

Beam steering cell 40 electrically steers light beam 32 from the first direction to a second direction different from the first direction. In certain embodiments, beam steering cell 40 may receive one or more voltages and electrically steer the light beam with the EO material 46 to in response to the voltages. The beam may be steered to a divergence angle θ with respect to a cylindrical axis 22 of cannula 20. Divergence angle θ may have any suitable value, such as a value in the range of 0 to 90 degrees.

Cover plate 42 of beam steering cell 40 may comprise any suitable transparent material, such as glass, and may have any suitable shape and size, such as a flat planar shape with a thickness in the range of 10 to 200 microns. Electrode layers 44 (44a-b) conduct electrical current from a power source 31 to apply voltage to EO element 46. Electrode layers 44 may comprise any suitable conductive material, such as indium tin oxide (ITO).

EO element 46 changes its refractive index in response to an applied electrical field. Accordingly, EO element 46 may change the direction of a light beam in response to an applied voltage. EO element 46 may comprise any suitable EO material, such as an optically transparent electrically conductive (OTEC) material. Examples of OTEC material are described with reference to FIG. 2. Prism 48 is a transparent optical element that refracts light beam 32.

EO element 46 and prism 48 may have any suitable shape and arrangement. In certain embodiments, they may be configured such that a portion of light beam 32 passes through more EO element 46 than another portion passes through, and less of prism 48 than the other portion passes through. In the illustrated example, portions 60 (60a-b) of an optical path go through EO element 46 and prism 48. EO element 46 and prism 48 each have a wedge shape where the length of the optical path through each varies for different parts of beam 32. Portion 60a has an OE part 64a and prism part 66a, and portion 60b has a OE part 64b and prism part 66b. OE part 64a is greater than OE part 64b, and prism part 66a is less than prism part 66b. EO element 46 and prism 48 may have any suitable size. For example, the thickest portion of EO element 46 may be in the range of 30 to 600 microns, and the thinnest portion may be in the range of 0 to 100 microns. The thickest portion of prism 48 may be in the range of 130 to 700 microns, and the thinnest portion may be in the range of 100 to 200 microns.

Power source 31 supplies electricity to electrodes 30 to apply voltage to beam steering cell 40 to steer light beam 32. In certain embodiments, power source 31 may change the voltages to change the direction of light beam 32 to yield a pattern of emitted light. Examples of this are described in more detail with reference to FIG. 7.

Figure 2A:
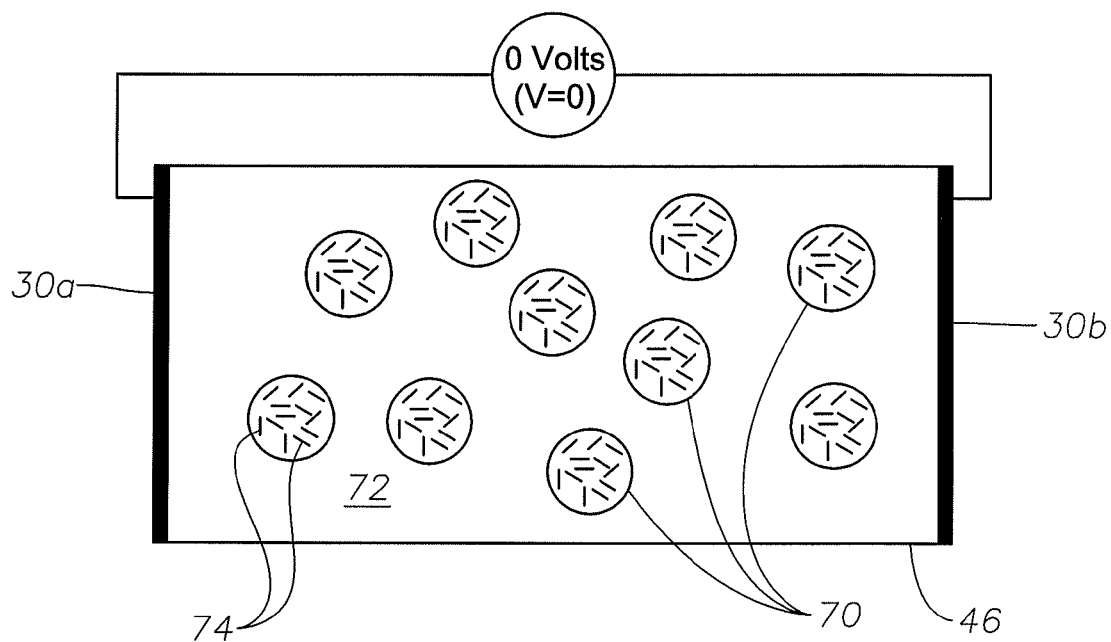
FIGS. 2A and 2B illustrate an example of an electro-optical (EO) material that may be used in a system that electrically steers light according to certain embodiments.
Figure 2B:
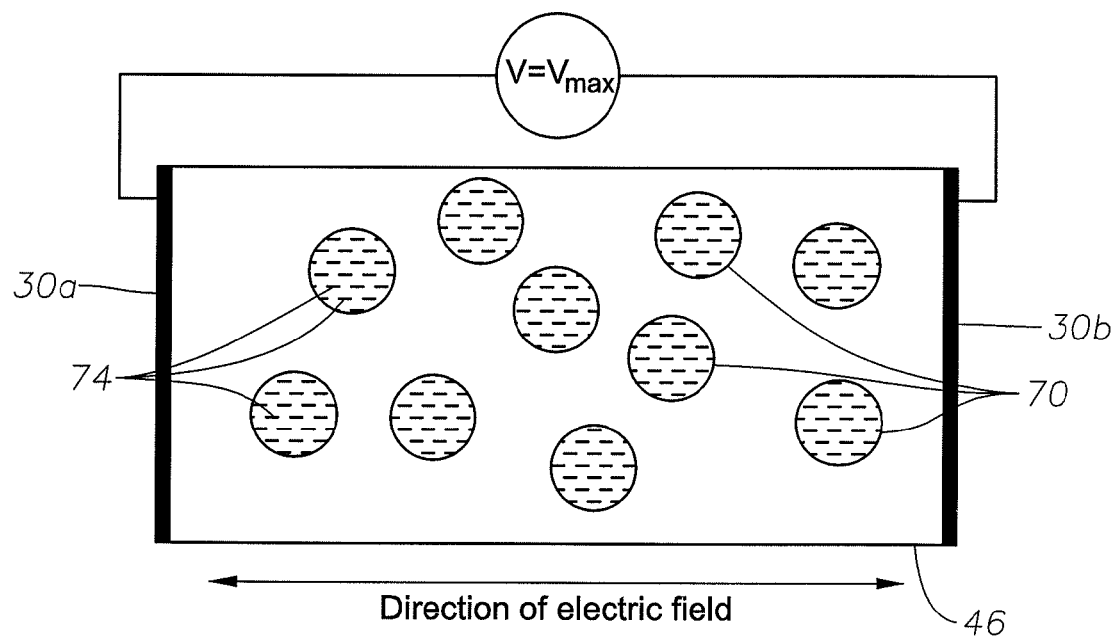

FIGS. 2A and 2B illustrate an example of an electro-optical (EO) material that may be used in a system that electrically steers light according to certain embodiments. In the example, EO material 46 is disposed between electrodes 30.

EO material 46 may be a liquid crystal (LC) such as a polymer-dispersed liquid crystal (PDLC) material. In PDLC material, tiny circular or quasi-circular LC droplets 70 with LC molecules 74 are immersed within a medium of hardened polymer 72. Droplets 70 are immobilized within polymer 72, but LC molecules 74 within droplets 70 are free to rotate. In the absence of an electric field, the orientations of LC molecules 74 tend to be random, and the resulting effective refractive index of LC droplet 70 is $n_{LC}$ (V=0)=$n_{LCo}$ (FIG. 2A).

As increasing voltage is applied to the PDLC material, LC molecules 74 tend to orient more and more along the direction of the electric field, and the refractive index of droplet 70 changes from $n_{LCo}$ to $n_{LC}(V)$. At maximum voltage $V_{max}$, LC molecules 74 have aligned with the electric field, and the refractive index of LC droplet 70 is $n_{LC}(V_{max})$ (FIG. 2B).

LC droplets 70 may be on the order of a wavelength of laser light or smaller to avoid scattering light from the incident beam off LC droplets 70. The PDLC material illuminated by the laser beam appears as an effective medium with an effective refractive index $n_{eff}$, which is dependent on the constant polymer index $n_{polymer}$ and the voltage-dependent LC droplet effective index $n_{LC}$. Therefore, the effective index $n_{eff}$ is also voltage-dependent and varies from $n_{effo}$ at 0 volts to $n_{eff\text{-}max}$ at $V_{max}$.

In the example of FIG. 1, divergence angle θ may be given by:

$$\theta(V)=\sin^{-1}\{(n_g/n_m)\sin[\alpha-\sin^{-1}([n_{eff}(V)/n_g]\sin\alpha)]\}$$

where $n_g$ is the refractive index of the glass prism, $n_m$ is the refractive index of the ambient medium, and α is the wedge angle of the prism. For small prism angles α, this equation can be approximated as:

$$\theta(V)=\{[n_g-n_{eff}(V)]/n_m\}\alpha$$

Therefore, the beam can be steered continuously between 0 degrees and $\theta_{max}$, (which typically occurs at $V_{max}$).

Figure 3:
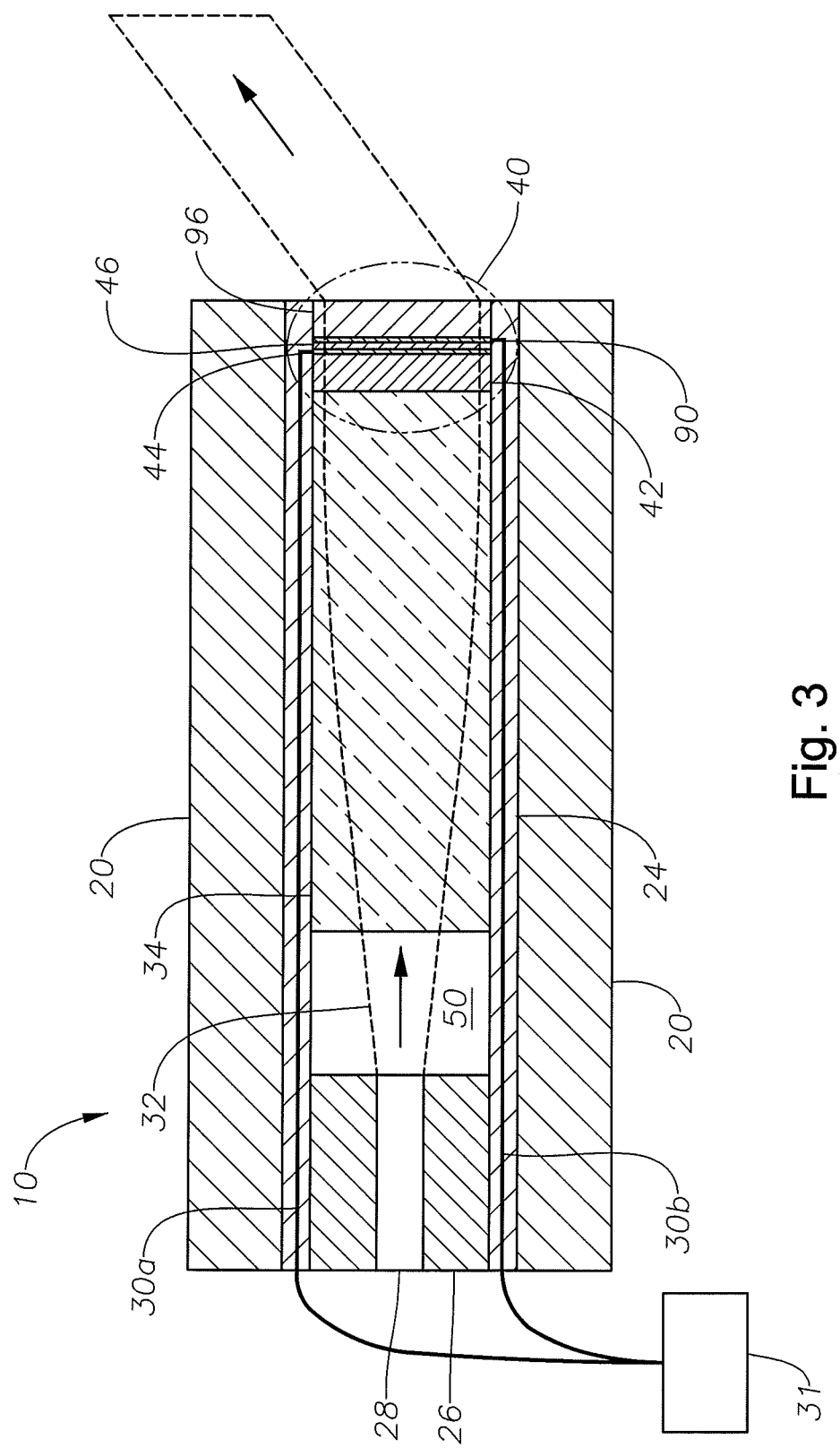
FIGS. 3 and 4 illustrate another example of a system that can electrically steer light in a laser probe according to certain embodiments.
Figure 4:
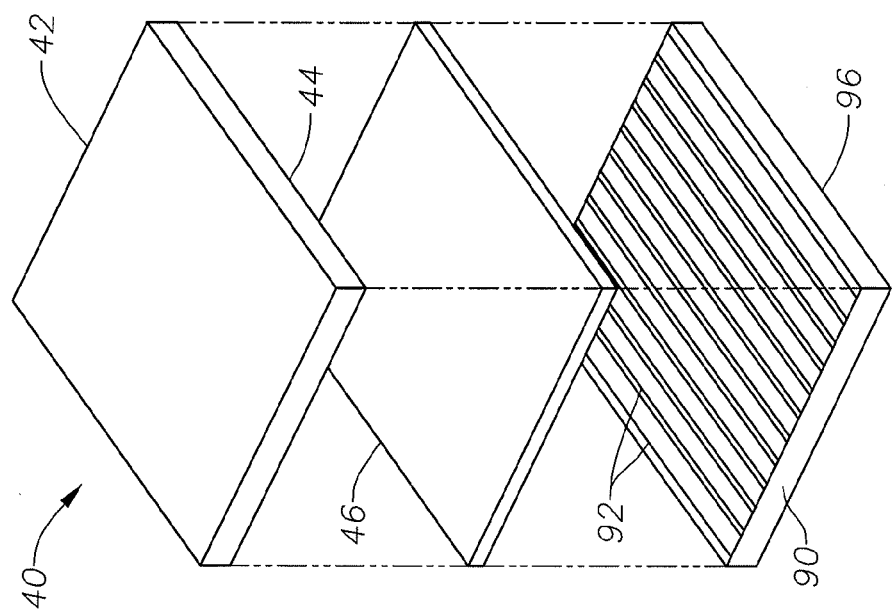

FIGS. 3 and 4 illustrate another example of a system 10 that can electrically steer light in a laser probe according to certain embodiments. System 10 steers light by applying different voltages across different portions of beam steering cell 40. In the example, beam steering cell 40 includes cover plate 42, electrode layer 44 disposed outwardly from cover plate 42, OE element 46 disposed outwardly from electrode layer 44, electrode layer 90 disposed outwardly from OE element 46, and a cover plate 96.

Electrode layers 44 and 90 apply different voltages across OE element 46. In certain embodiments, electrode layer 90 comprises strip electrodes 92, where at least two strip electrodes 92 apply different voltages. A strip electrode 92 may comprise any conductive material, such as ITO. In certain embodiments, strip electrodes 92 are individually addressable to yield monotonically changing voltage vs. position pattern.

FIGS. 5A through 5D illustrate an example of voltages applied to beam steering cell 40 of FIGS. 3 and 4 according to certain embodiments. The figures show how voltages may be applied to beam steering cell 40 with strip electrodes 92 to yield a monotonically changing refractive index versus position pattern.

Figure 5A:
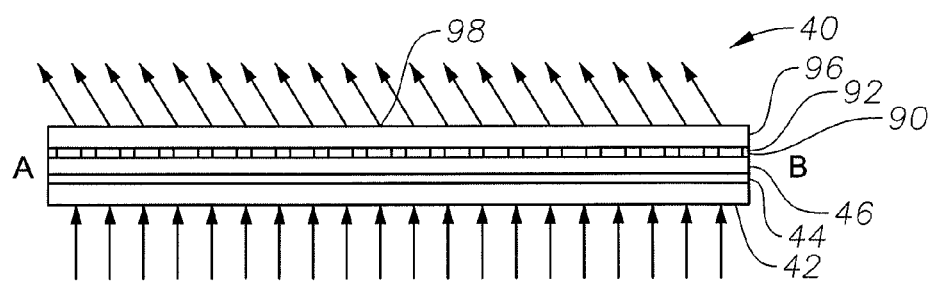
FIGS. 5A through 5D illustrate an example of voltages applied to a beam steering cell according to certain embodiments.
Figure 5B:
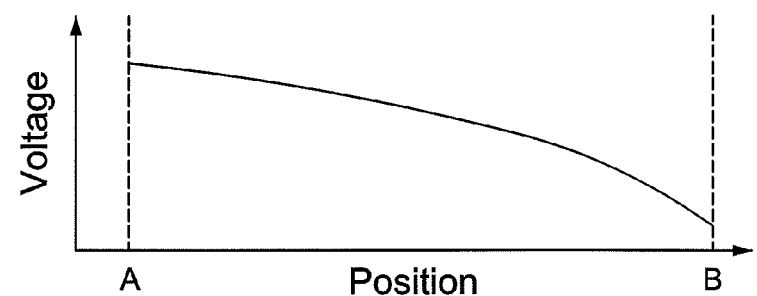
Figure 5C:
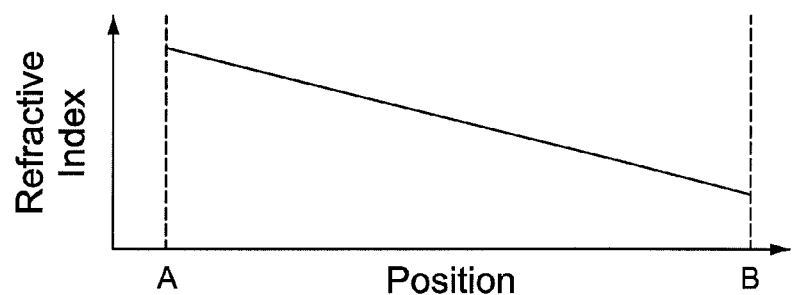
Figure 5D:
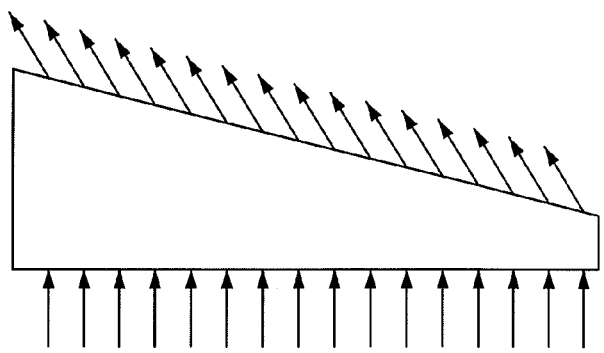

FIG. 5A illustrates an example of a beam steering cell 40 with strip electrodes 92 and sides A and B. Different strip electrodes 92 may apply different voltages to yield a voltage vs. position pattern. Any suitable voltages may be applied. In the example of FIG. 5B, the voltages monotonically change with respect to position from side A to side B, e.g., from a voltage in a range of 10 to 250 volts at side A to a voltage in a range of 0 to 5 volts at side B. The voltage vs. position pattern yields a refractive index vs. position pattern. In the example of FIG. 5C, the refractive index monotonically changes with respect to position from side A to side B, e.g., from a refractive index in a range of 1.5 to 1.8 at side A to a refractive index in a range of 1.4 to 1.6 at side B. Accordingly, beam steering cell 40 may operate similarly to a wedge-shaped prism of FIG. 5D.

The time for a beam to pass through an optical element is inversely dependent on its optical thickness, which is product of the refractive index and thickness of cell 40 where the beam is traveling. In the illustrated example, the cell thickness is constant across the entire cell 40 and the refractive index varies across cell 40, so the optical thickness, and thus the beam transit time, varies monotonically across the cell. The refractive index is lower on the B side of the cell than the A side, so the beam passes through the B side of the cell faster than on the A side.

In certain situations, incident and emitted beams are collimated. When a collimated beam is normally incident on cell 40 of FIG. 5A, the beam reaches an outer surface 98 of plate 96 on the B side more quickly than it does on the A side because the reflective index is lower on the B side than on the A side. According to optical principles, the beam emerging from surface 98 should be planar, with the wavefront perpendicular to the beam direction. Thus, there is beam steering to the A side as the beam exits cell 40. Accordingly, rays between the planar wave front incident on the cell and the planar wave front exiting the cell have the same total optical path length. The same principle applies for the wedge prism, except in that case, the refractive index is constant and the prism thickness varies with lateral position. But the end result is the same: the planar striped LC cell has the same effect on incident light as a constant-index wedge prism.

Figure 6:
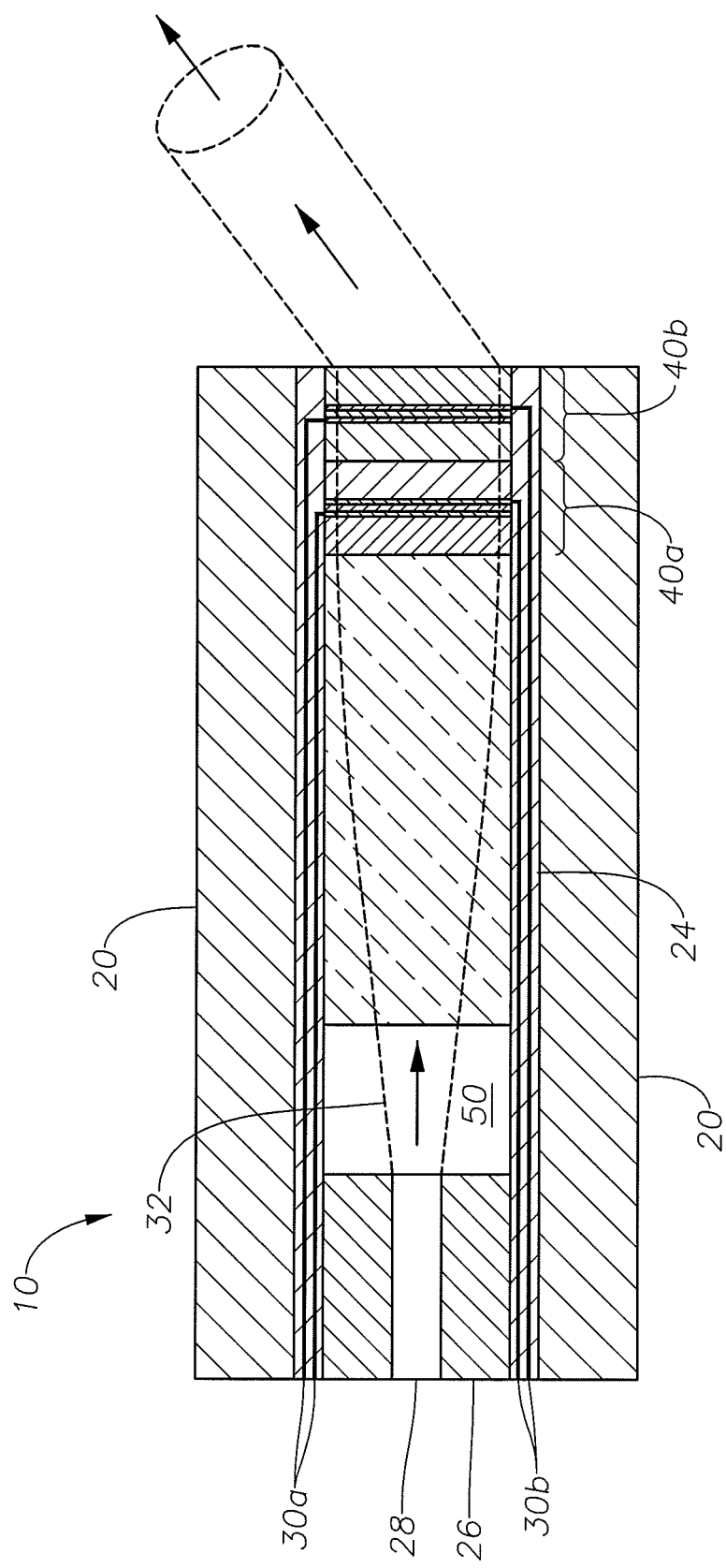
FIG. 6 illustrates an example of a system that can electrically steer light in two dimensions according to certain embodiments.

FIG. 6 illustrates an example of a system 10 that can electrically steer light in two dimensions according to certain embodiments. Two or more beam steering cells 40 (40a-b) may be positioned in different directions to steer light beam 32 in two dimensions. For example, two beam steering cells 40 may be position orthogonally such that cell 40a moves beam 32 along a first coordinate axis and cell 40b moves beam 32 along a second coordinate axis orthogonal to the first coordinate axis to allow for two-dimensional beam steering.

Figure 7:
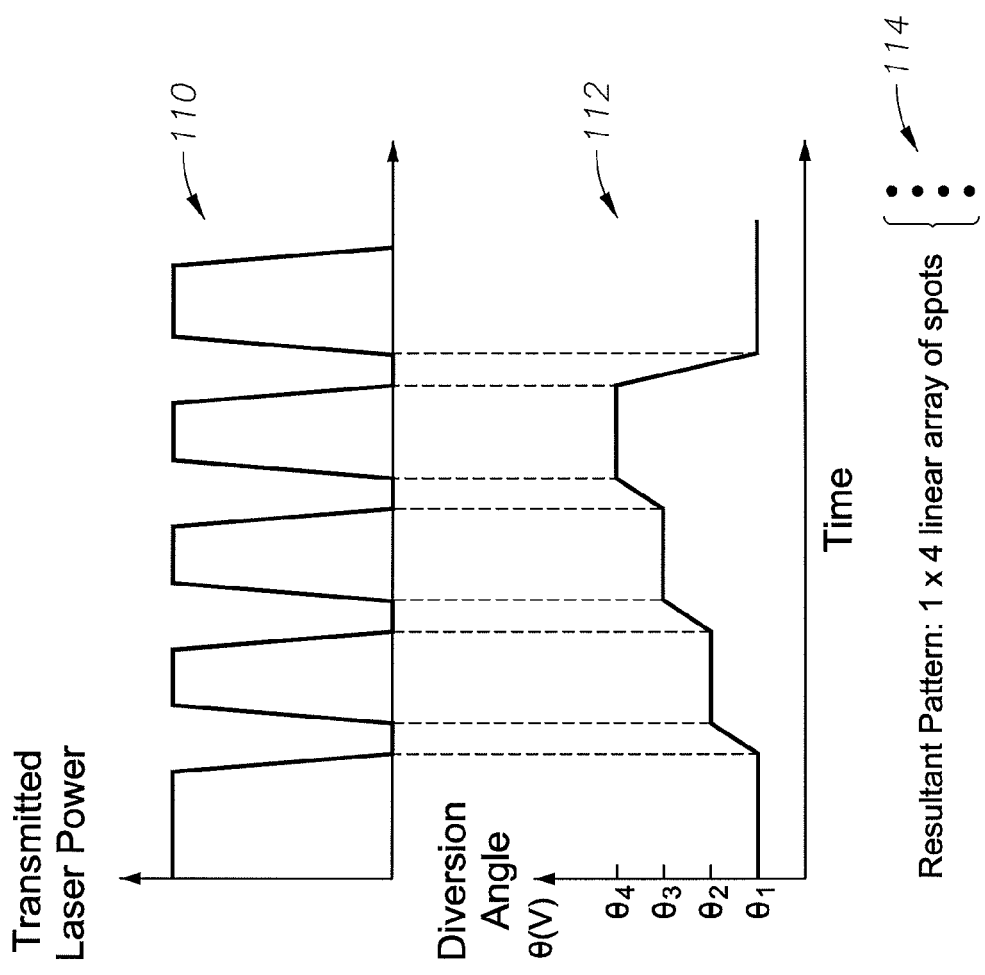
FIG. 7 illustrates an example of a pattern of divergence angles that may be used to yield a pattern of emitted light according to certain embodiments.

FIG. 7 illustrates an example of a pattern of diversion angles that may be used to yield a pattern of emitted light. In certain embodiments, the voltages applied to beam steering cell 40 may be changed to change divergence angle θ. In the example, graph 112 shows divergence angle changing with respect to time from $θ_i=θ_1$ to $θ_4$. The changes in divergence angle θ may yield a particular pattern of emitted light. In the example, graph 114 shows the pattern of emitted light resulting from the changes in divergence angle θ. In certain embodiments, the laser power may be synchronized to be on when divergence angle θ is at a desired angle $θ_i$, but off when divergence angle θ transitioning between desired angles $θ_i$. The resulting light pattern may have clearer, less blurry, spots.

In certain embodiments, the changes in voltage may be performed by a component that may include an interface, logic, memory, and/or other suitable element, any of which may include hardware and/or software. An interface can receive input, send output, process the input and/or output, and/or perform other suitable operations. Logic can perform the operations of a component, for example, execute instructions to generate output from input. Logic may be encoded in memory and may perform operations when executed by a computer. Logic may be a processor, such as one or more computers, one or more microprocessors, one or more applications, and/or other logic. A memory can store information and may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable media.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, and the operations of the systems and apparatuses may be performed by more, fewer, or other components. As another example, modifications may be made to the methods disclosed herein. The methods may include more, fewer, or other steps, and the steps may be performed in any suitable order.

Other modifications are possible without departing from the scope of the invention. For example, the description illustrates embodiments in particular practical applications, yet other applications will be apparent to those skilled in the art. In addition, future developments will occur in the arts discussed herein, and the disclosed systems, apparatuses, and methods will be utilized with such future developments.

The scope of the invention should not be determined with reference to the description. In accordance with patent statutes, the description explains and illustrates the principles and modes of operation of the invention using exemplary embodiments. The description enables others skilled in the art to utilize the systems, apparatuses, and methods in various embodiments and with various modifications, but should not be used to determine the scope of the invention.

The scope of the invention should be determined with reference to the claims and the full scope of equivalents to which the claims are entitled. All claims terms should be given their broadest reasonable constructions and their ordinary meanings as understood by those skilled in the art, unless an explicit indication to the contrary is made herein. For example, use of the singular articles such as "a," "the," etc. should be read to recite one or more of the indicated elements, unless a claim recites an explicit limitation to the contrary. As another example, "each" refers to each member of a set or each member of a subset of a set, where a set may include zero, one, or more than one element. In sum, the invention is capable of modification, and the scope of the invention should be determined, not with reference to the description, but with reference to the claims and their full scope of equivalents.

What is claimed is:

1. A system comprising:
    a housing having a tubular shape defining an interior region and a distal end opening;
    an optical waveguide disposed within the housing, the optical waveguide configured to emit a light beam travelling in a first direction; and
    a beam steering cell disposed within the housing distal to the optical waveguide so as to receive at least a portion of the light beam, the beam steering cell comprising an electro-optical (EO) element that includes an EO material that changes its refractive index in response to an applied voltage, the beam steering cell configured to:
        receive a voltage from a plurality of electrodes; and
        steer the light beam from the first direction to a second direction different than the first direction in response to a change in the refractive index of the EO material caused by the voltage received from the plurality of electrodes, and
    wherein the EO element comprises a shape having varying thickness such that a first portion of the light beam passes through a first portion of EO element and a second portion of the light beam passes through a second portion of the EO element, the first portion of the EO element having a greater thickness than the second portion of the the EO element.

2. The system of claim 1, the beam steering cell further comprising:
- a first electrode layer disposed proximal to the EO element;
- a prism disposed distal to the EO element; and
- a second electrode layer disposed distal to the prism;
- wherein the prism comprises a shape having varying thickness such that the first portion of the light beam passes through a first portion of the prism and the second portion of the light beam passes through a second portion of the prism, the first portion of the prism having a lesser thickness than the second portion of the prism.

3. The system of claim 1, the housing comprising a cannula.

4. The system of claim 1, the EO material comprising a polymer-dispersed liquid crystal (PDLC) material.

5. The system of claim 1, wherein each electrode of the plurality of electrodes comprises an indium tin oxide (ITO) material.

6. The system of claim 1, further comprising:
- a power source coupled to the plurality of electrodes, the power source configured to supply the voltage to the plurality of electrodes.

7. The system of claim 1, further comprising:
- a power source configured to change the voltage received by the beam steering cell, the changed voltage received by the beam steering cell causing the beam steering cell to steer the light beam to a different direction than the second direction.

* * * * *